W. J. WELSH.
MOLD FILLING AND SHAKING MACHINE.
APPLICATION FILED MAR. 20, 1920.

1,366,226.

Patented Jan. 18, 1921.
6 SHEETS—SHEET 2.

Inventor
W. J. Welsh
By Davis Davis
Attorney

W. J. WELSH.
MOLD FILLING AND SHAKING MACHINE.
APPLICATION FILED MAR. 20, 1920.

1,366,226.

Patented Jan. 18, 1921.
6 SHEETS—SHEET 4.

Inventor
W. J. Welsh

By
Attorneys

UNITED STATES PATENT OFFICE.

WILLIAM JAMES WELSH, OF JERSEY CITY, NEW JERSEY.

MOLD FILLING AND SHAKING MACHINE.

1,366,226.  Specification of Letters Patent.  Patented Jan. 18, 1921.

Substitute for application Serial No. 47,433, filed August 26, 1915. This application filed March 20, 1920.
Serial No. 367,386.

*To all whom it may concern:*

Be it known that I, WILLIAM J. WELSH, a subject of the King of Great Britain, and a resident of Jersey City, county of Hudson, and State of New Jersey, have invented certain new and useful Improvements in Mold Filling and Shaking Machines, of which the following is a full, clear, and exact description.

This invention relates more particularly to an automatic chocolate mold filling and shaking machine.

One of the principal objects of the invention is to provide a machine or apparatus in which chocolate or other confectionery in a plastic or other form may be made to fill molds of any desired shape with the proper quantity of chocolate and the molds shaken or agitated in such a way as to eliminate all air holes so that the mass may be compact and thoroughly homogeneous, all of which may be accomplished in a single machine and automatically.

Another object of the invention is to provide a machine or apparatus in which independent molds may be automatically fed in position to receive chocolate or other material in a plastic or other form and the surplus material removed from the molds at one end of the machine or apparatus and the filled molds subjected to a vibratory agitation as it passes through the machine so as to cause the chocolate or other material to settle and become compact and free from air holes, thus avoiding the necessity for handling the material manually and at the same time dispensing with considerable help and providing a more satisfactory product than is accomplished by the usual methods.

Other objects of the invention are to provide simple and efficient filling means for molds; to provide simple and efficient means for removing the surplus chocolate or material from the molds, and to provide simple means for agitating the molds.

A further object of the invention is to provide simple and efficient means whereby the various parts of the apparatus may be adjusted to adapt different sizes of molds to be employed.

A still further object of the invention is to provide a means whereby after the molds have been filled with one material, other material of a different character as nuts may be deposited on the chocolate in the molds during its passage through the apparatus.

With these and other objects in view, the invention will be hereinafter more particularly described with reference to the accompanying drawings, which form a part of this specification, and will then be pointed out in the claims at the end of the description.

While I show the invention as constructed particularly for handling chocolate or other material used in confectionery, it will be understood that the invention is applicable for different purposes and for handling different kinds of material, and that some of the parts may be used independently of other parts or in connection with parts differently constructed or otherwise.

In the special character of machine shown, the molds are rectangular having a number of pockets and are arranged in stacks at one end of the machine or apparatus. The molds by means of an endless chain are fed successively along a track, one mold ordinarily serving as a propelling or pushing means for those molds in advance. As the molds move forward along the track they are presented under a hopper or receptacle containing chocolate. The chocolate in very soft or in a plastic or semi-plastic state as the case may be is fed to the molds in the desired quantity and as the mold passes beyond the filling or chocolate feeding means, the material is spread by means provided for that purpose and the surplus material removed from the molds. As the molds continue to advance, there may be placed thereon or mixed in with the chocolate, nuts or any other material after which molds move on to a vibratory platform or table. This table may be operatively connected to the mechanism of the mold filling end of the machine or independently operated and during the vibratory movement of the table, the material is caused to settle and become compact and homogeneous and free from air holes and the like.

The frame 10 of the machine or apparatus comprises two sections 11 and 12, the former being for the mold end of the machine and the latter for the shaker end, said sections being held together by an intermediate section 12ᵃ if desired. The section 11 comprises side members 13 and 14 and may be suitably braced throughout its length by tie bars or otherwise. The section 11 or the mold filling end of the machine has the side frames or members 13 and 14 connected by transverse tie bars 15 at suitable distances apart. Supported by the tie bars 15 are L-shaped rails 16 and 17 forming a mold track. These rails 16 and 17 may be of angle iron and are arranged in parallel relation and are ordinarily adapted to be spread apart or moved toward each other to adapt the same for different sized molds, as will be presently described. On the rails 16 and 17 and at one end of the machine are angle iron uprights 18. There are four uprights each of which is fastened to one of the track rails. Two of the uprights 18 are secured to the rail 16 and two of the track rails 17 and said uprights are adapted to serve as vertical guides for rectangular molds 19. The molds 19 may have a number of pockets and may be of any desired number, the uprights 18 serving in a measure as a hopper or magazine for the molds, though molds may be in the form of a carrier instead of independent sections as shown. The two outer uprights 18 may be adjustable along the tracks 16 and 17 with respect to the two other uprights 18 for different lengths of molds. This may be accomplished by means of a foot or bracket 20, Fig. 3, one part of which has one of the uprights 18 secured thereto, the other part of said bracket being provided with a bolt 21 or other fastening means whereby one of the uprights may be moved lengthwise of each of the track rails 16 and 17. The lowermost mold 19 is adapted to be supported upon and between the rails 16 and 17 and in the path of movement of floats or engaging members 22 which move with an endless chain or carrier 23. This chain 23 may be of the sprocket character and passes about sprocket wheels 24, 25 and 26. The sprocket wheel 26 is held to a shaft 27 and said shaft is adapted to be adjusted lengthwise of the machine by means of screws 28 and hand wheels 29 on the screws for the purpose of taking up any slack that may occur in said chain. The sprocket wheel 25 is held to a shaft 30 and this shaft is mounted to rotate in the frame members 13 and 14 and at one end thereof is provided with a pulley 31 by which said shaft may be rotated. This shaft may be also provided with a second power driven pulley or the said shaft may have the usual fast and loose pulleys for driving purposes or may be driven from a pulley 31ᵃ on a main drive shaft 31ᵇ or in any other desired manner.

As the molds 19 are forced along the track by the movement of the chain 23, they travel under a chocolate holding or feeding device 32. This device or means may be variously constructed. As shown, it has a cylindrical tank-like member or casing 33 which is supported above a base 34, both of which are held to standards or uprights 35 and 36 which project from the frame members 13 and 14 respectively. The base 34 is conical in form and may comprise an outer member 37 and an inner member 38. Each of the members 33, 37 and 38 have flanges which are adapted to be secured together to form a single member or casing, and the members 37 and 38 are conical or tapering and the tapering portion spaced apart so as to provide an annular chamber 39. The annular chamber is adapted to hold water which may be kept heated by steam or in any other suitable manner so as to prevent the chocolate which is held in the device 32 from becoming dry. An inlet pipe 40 having suitable valves for steam and for water connect with the chamber 39 and at the upper portion of the chamber may be arranged an outlet opening 41, there being provided a sight or other gage, as 42, of any suitable construction for determining whether or not the chamber 39 is provided with sufficient water to keep the chocolate or other material within the device 32 in proper condition.

The lower portion of the casing member 38 of the device 32 extends below the member 39 and held to this extension is a cylindrical portion 43. This cylindrical portion or spout may be in two parts held together and between said parts and adapted to move across the same is a shut-off slide or gate 44. The gate 44 is connected by a link 45 to the lower arm of a hand lever 46 by which said gate may be moved to permit the chocolate or other material to pass out of the spout or to be cut off according to whether the handle 46 is forced inward or outward.

A shaft 47 is rotatably held within the casing 32. This shaft 47 has its upper end supported in a cross-bar 48 serving as a bearing for the upper end of said shaft and the lower end of said shaft has a bearing in a cross-bar 49. On the shaft 47 under the bar 48 are wings, blades or parts 50 and 51 and on the lower part of the shaft above the bearing bar 49 are wings, blades or parts 52 and 53. The wings or parts 51 and 52 are disk-like and semi-cylindrical and substantially fit the casing member 33 and are arranged angularly with respect to each other and in such a way as to be substantially spiral in form to adapt the wings when the shaft 47 is rotated to have a forcing or compressing effect on the chocolate or material in the device 32 so as to force the same through the spout or nozzle 43. The wings 52 and 53 are substantially the same as the wings 50 and 51 but somewhat smaller and their action and purpose are the same, and both sets of wings may be adjustable along the rod 47. At the upper end of the shaft 47 is a miter gear 54 which is in mesh with a similar gear 55, said gear 54 being loose on the shaft 47 but is adapted to rotate said shaft as will be presently described. The gear 55 is held to a horizontally arranged shaft 56 on the outer end of which is a pulley 57 which may be rotated from the pulley 57$^a$ on the drive shaft 30 by means of a belt 58. The gear 54 is loose on the shaft 47 and said shaft is yieldably forced downward by a spring 59, said shaft having a key 59$^a$ which is adapted to fit loosely grooves in the gear 54. The spring 59 may have its pressure varied by means of a screw or bolt 60 arranged in a part of an inclosing and protecting casing 61 supported by the bearing of the shaft 56, said casing being adapted to inclose the gears and prevent their coming into contact with the chocolate in the casing 33. The bolt 60 has a cap 61$^a$ which forms a seat for one end of the spring 59 and may rotate with the spring and the shaft 47 when the latter rotates. The purpose of the bolt 60 and the spring 59 is to hold the shaft 47 and wings down with the desired pressure, and should the pressure increase to an extent that might injure the molds, the spring will yield and the shaft will move upwardly carrying the key 59$^a$ therewith out of engagement with the grooves in the gear 54, which will permit the gear 54 to rotate about the shaft 47 and consequently the feeding devices or wings to remain idle and therefore not positively feed the chocolate out of the casing 33, said key and grooves being tapered to permit easy connection and disconnection. A hood 62 is held to the nozzle or throat 43. This hood is substantially rectangular and has a fixed member 62$^a$ and two adjustable members 62$^b$ and 62$^c$. The members 62$^b$ and 62$^c$ are adjustable transversely of the machine for different widths of molds and have downwardly and outwardly flared walls which engage the upper edges of the molds to scrape and level the chocolate and assist in spreading the chocolate over the different mold pockets in a uniform way. The shield or hood serves as a means when the chocolate is forced under pressure by the feeding wings to distribute the chocolate over the molds. The positive feeding devices are used when the chocolate has such a consistency that it will not flow without some positive feeding or forcing means, as when it is in a plastic or semi-plastic condition, but when soft and in a condition to flow readily and freely the feeding wings need not be used in which case the nozzle under control of the shut-off slide or gate 44 may be used as the feeding or filling means for the molds.

The molds having received the proper amount of chocolate or other material from the device 32 and particularly when in a very soft state, so as not to need the positive feeding means and hood 62, will have the chocolate properly distributed by means independent of the device 32 as the molds are forced along the track. The molds with the different pockets are somewhat higher than the upper surface of the rails 16 and 17 and as the molds move along the tracks, they meet successively the spreaders or distributers 66, 65, 64 and 63, though this number may vary. Each of the distributers are similarly constructed and the description of one will answer for the others. Each distributer comprises a blade 66$^a$ which may consist of three members 67, 68 and 69. The member 69 may be narrow and of leather and is arranged intermediate the plate-like metal clamping members 67 and 68 and projects somewhat beyond the outer members, the lower edge of the member 69 being adapted to rest on the upper edge of the molds so as to distribute the chocolate or material over the surface of the molds to fill the different molds uniformly. The plate-like members 67, 68 and 69 form substantially a single element or member and are held by means of screws 70 or otherwise to arms 71, said screws serving to clamp the members 67 and 68 to hold the member 69 between them. The arms 71 are adjustably secured to a rod or shaft 72 which extends transversely of the machine and has bearings in frame plates 73 and 74. These plates are held by bolts 75 or otherwise to the rails 16 and 17 respectively and serve also as the support for the adjustable members of the hood 62. The blades 66 are arranged at an angle so that they may be forced with the desired pressure against the upper edge of the molds and are yieldingly held in this position by means of springs 76, one end of which is held to either one of the frame plates 73 and 74 and the other end of said spring is held to a rod or arm 77 extending outward from said shaft and tending normally to force said arm downwardly. The blades 66ª are longer than the molds are wide to adapt the side frames 73 and 74 to be moved relatively to each other for different widths of molds, as will be presently described, and said blades pass through slots or openings 78 in the side frame plates 73 and 74, said slots being of sufficient size to permit a yielding movement of the knives or scrapers. The openings 78 are normally closed by means of plates or guards 79 to prevent the surplus chocolate from passing through the openings 78. These plates are located immediately adjacent the inner faces of the frame plates 73 and 74 and are loosely supported from the rod 72 in such a way as to be normally held at the same inclination as the slots or openings 78 in order always to cover the same. It will be noticed that the position of the distributers 63, 64, 65 and 66 alternate with respect to each other. That is, two of such distributers or spreaders are mounted upon the side frame or plate 73 and two on the side frame 74. This arrangement of the distributers may be changed, however, since it is employed simply for convenience in connection with the transverse or lateral adjustment of the parts hereinafter described to adapt the machine for use with molds of different widths.

The molds after passing by the spreaders or distributers 63 to 66 are subjected to vibratory action in order that the material may be made compact and free from air holes. To accomplish this, the tracks 16 and 17 may each have a separate independent movable portion at one end along which the molds travel so as to provide a platform and this platform may be given a rapid vertical movement, though instead of the tracks being movable with the molds, the molds may be vibrated independently of the tracks. As shown, the track members or rails 16ª and 17ª are hinged by links 79ª, Fig. 1, to rails 16 and 17 or they may be independent, and said rails are supported on two substantially rectangular frames or platforms 80 and 81.

These members or platforms 80 and 81 are similarly constructed and at their corners are provided with bosses 82 from which project vertical rods or posts 83 around each of which is a spring 83ª. The posts 83 pass through flanges or glands 84 and 85 arranged on opposite sides of the top 86 of the frame sections 87 and 88. The sections 87 and 88 form a continuation of the sections or frame members 13 and 14 of the frame and may form a part of the latter. A bolt or threaded rod 89 extends through a threaded opening in the lower portion of each cap or flange 85 and at its upper end is adapted to form a stop for each post 83. There are eight threaded rods 89 and at the lower end of each rod is arranged a sprocket wheel 90 around which is adapted to pass a sprocket chain 91 so that all of said rods 89 may be simultaneously adjusted, there being a hand wheel, as 92, on one of said rods by which the chain and sprocket wheels may be moved. Each of the platforms 81 and 82 are provided with four sockets 93 formed by flanges pendent from the body of each of said platforms, and in each of said sockets is a fiber washer 94 and a rubber washer 95. The rubber washer is adapted to be engaged by a pin or projection 96 which extends from a socket 97 located on the outer end of an arm 98. There are eight of such arms arranged in pairs integral with each other and intermediate said arms there is a lug for the reception of a pin or bolt 99 by which the arms 98 rock up and down with the bolts 99 as a pivot, each pair of arms 98 serving in this manner when thus arranged as a single element or member and each element is supported independently by means of a bearing 100 secured to the upper surface of each of the frame sections 87 and 88. One of the arms of each vibratory element is provided with a lug 101 to which is pivotally held the upper end of an eccentric rod 102. The rod 102 is provided with an eccentric strap which is adapted to be moved up and down by an eccentric held to a transversely extending rod or shaft 103. There are two shafts 103 and four eccentrics, two on each shaft. One of the shafts 103 is provided with a bevel gear 104 and this gear is adapted to be rotated by a bevel gear 105 on a shaft 106, the said shaft being provided with a gear 106ª in mesh with a gear 106ᵇ on the main drive shaft 31ᵇ. One of the transverse shafts 103 is provided with a bevel gear 107 and this gear is in mesh with a similar bevel or miter gear 108 on a shaft 109 which extends lengthwise of the machine. On the shaft 109 is a miter gear 110 which is in mesh with another gear 111 on the other shaft 103 so that both shafts 103 may rotate in unison. As the drive shaft 31ᵇ is rotated, the belt about the pulley 31ª will drive the pulley 31 for the filling end of the machine and at the same time the shaft 106 will operate the two shafts 103 and through these move the eccentric rods 102. The eccentric rods will move the arms of the vibratory elements up and down so as to cause the pins or projections 96 to engage the washers in the frames 80 and 81. The washers are intended to prevent shock and noise and the arms 98 at one end of the frame sections 87 and 88 and those at the other end alternate with respect to each other so that the frames or platforms 80 and 81 will be raised uniformly at both ends of the machine to raise the molds and track members also uniformly. The extent of vibration is varied by the adjustment of the threaded bolts 89, as already described, as such adjustment will determine when the pins 96 engage the washers, the springs 83ª about the rods 83 serving to sustain the frames or platforms 80 and 81 yieldingly in their elevated position. It will be understood that the shaker table end of the machine may be independently driven.

Figure 1:
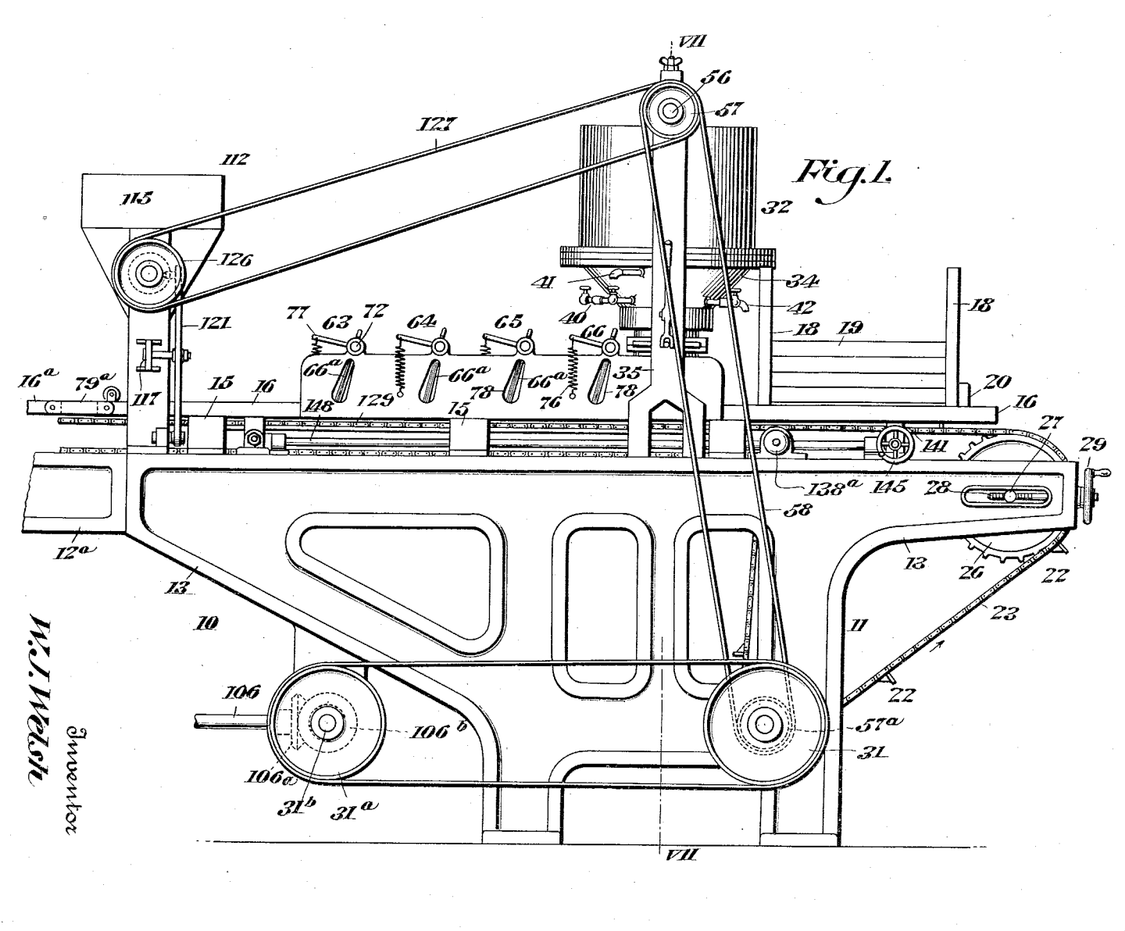
Figure 1 is a side elevation, partly broken away, of the mold filling end of the machine or apparatus of one embodiment of my invention.
Figure 3:
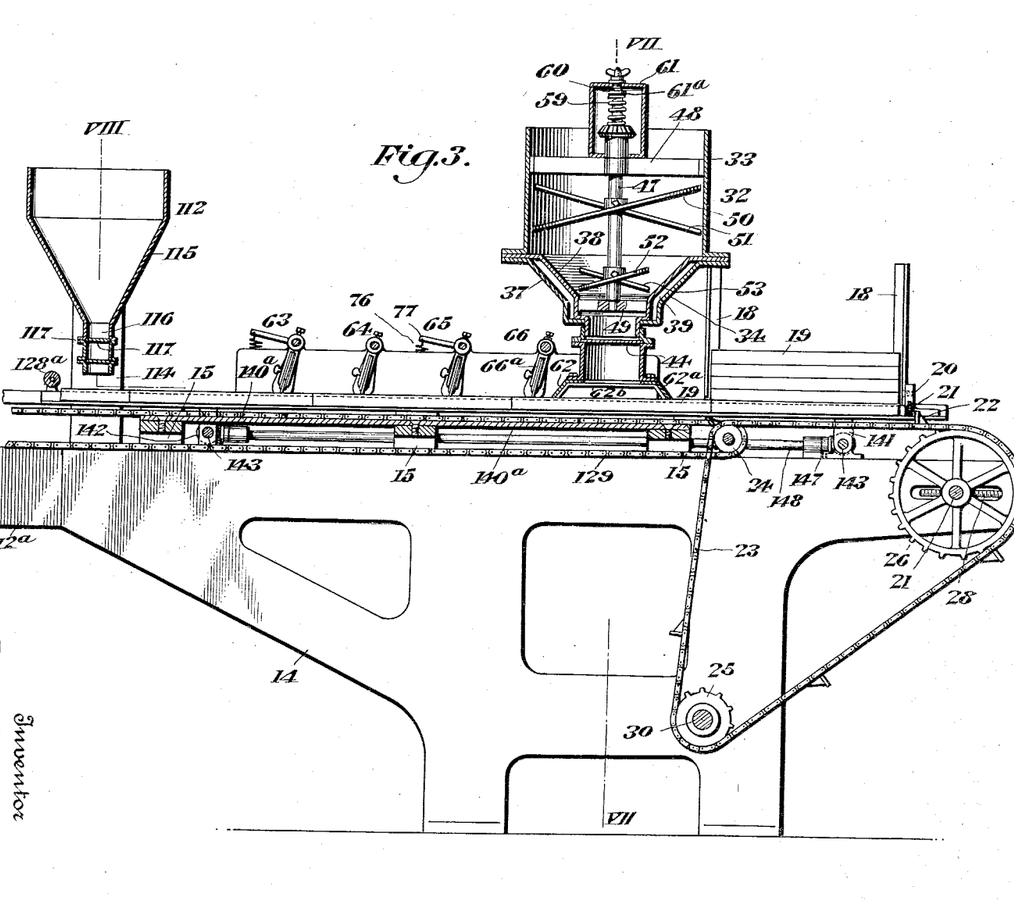
Fig. 3 is a vertical longitudinal section of the mold filling end of the machine.
Figure 4:
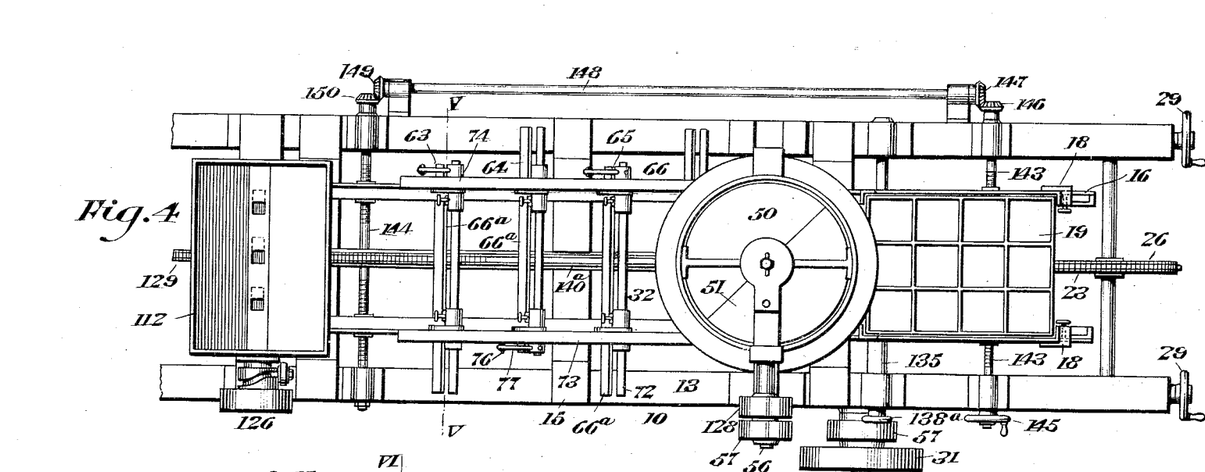
Fig. 4 is a plan view of Figs. 1 and 3.
Figure 5:
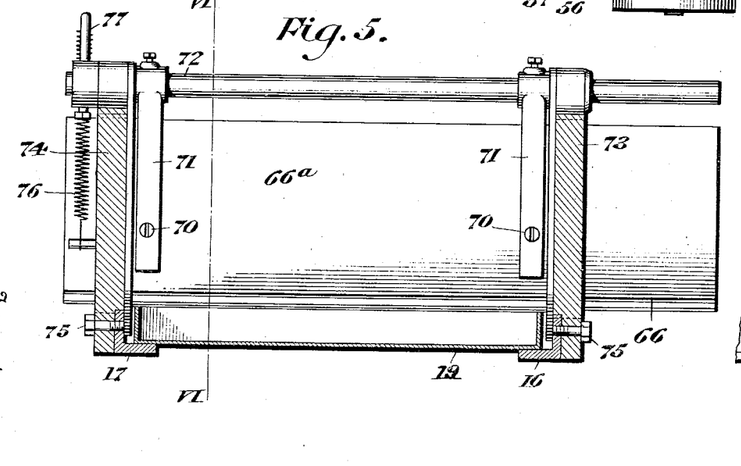
Fig. 5 is an enlarged transverse section taken on the line V—V of Fig. 4, showing one form of spreading or distributing means.
Figure 6:
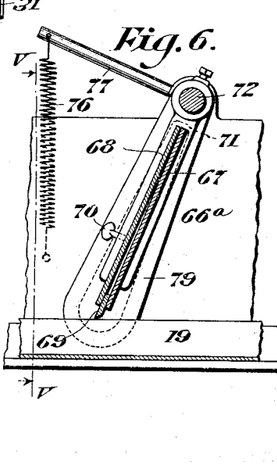
Fig. 6 is a fragmentary longitudinal section taken on the line VI—VI of Fig. 5.
Figures 7, 8, 9, 10:
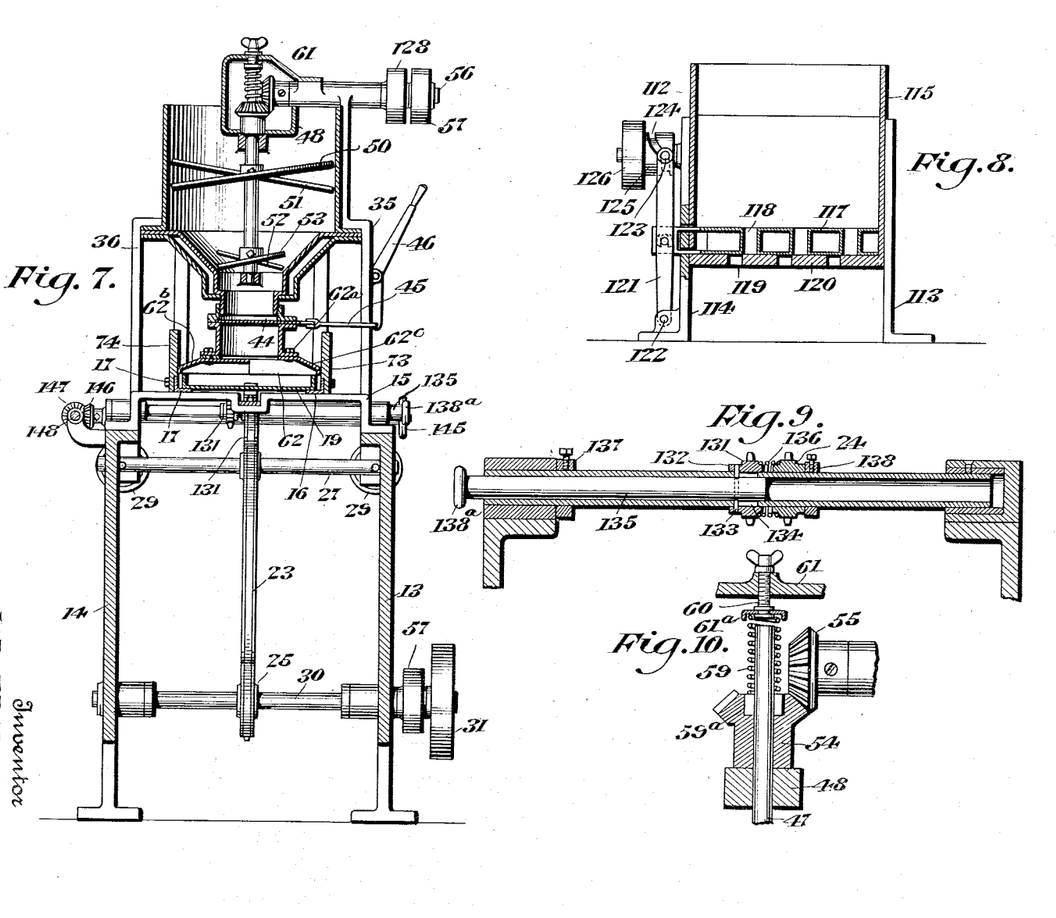
Fig. 7 is a vertical section taken on lines VII—VII of Figs. 1 and 3.
Fig. 8 is a vertical section taken on the line VIII—VIII of Fig. 3.
Fig. 9 is a fragmentary section, showing means whereby an auxiliary chain may be placed in action for forcing the molds through the machine.
Fig. 10 is an enlarged fragmentary section, partly in elevation, of means whereby pressure may be exerted upon the chocolates or other material being fed into the molds.
Figure 11:
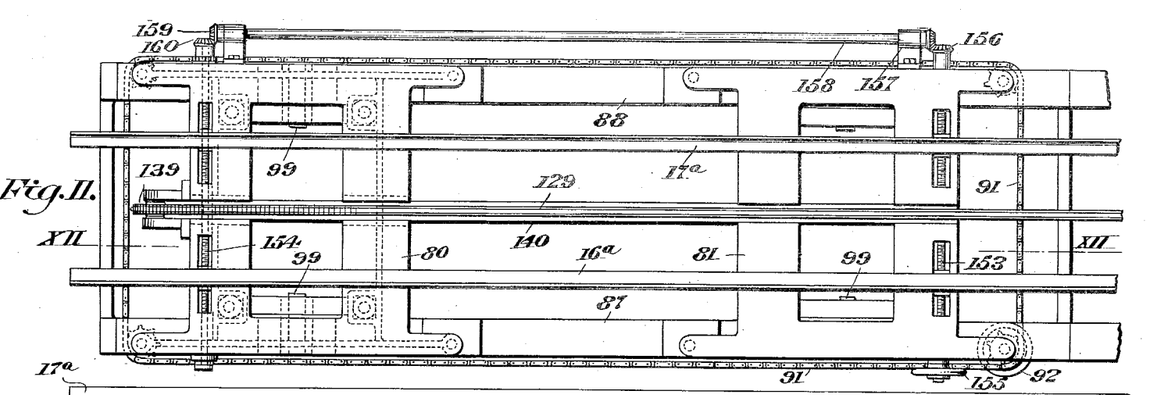
Fig. 11 is a plan view of the shaker end or tables of the machine or apparatus.
Figure 12:
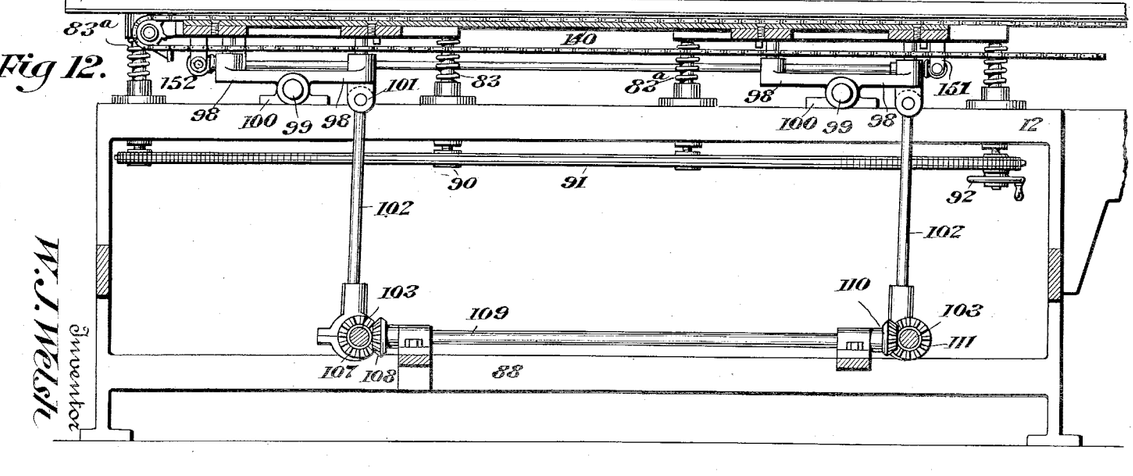
Fig. 12 is a vertical longitudinal section through the shaker table, the section being taken on the line XII—XII of Fig. 11.

If it is desired to place nuts or any other object or material into the molds over the chocolate or other material or so as to be mixed therewith during the advance movement of the molds from the spreading or distributing means to the vibratory and shaking means, this may be accomplished by the device 112, Figs. 1, 3 and 8, or in any other desired way. The frame sections 13 and 14 may have standards or uprights 113 and 114 secured thereto and projecting upwardly therefrom, and said uprights or standards are adapted to hold a hopper or receptacle 115. The hopper 115 may be of any suitable form and at the lower portion thereof may be narrowed to provide a throat 116. In the throat is adapted to move a slide 117 having openings or receivers forming pockets 118 into which the material, as nuts, in the hopper are adapted to pass. The pockets 118 are adapted to register with openings 119 in a transversely extending plate 120 and the slide 117 is timed so that the nuts or other material may pass through the openings 119 to be deposited into the pockets of the molds. The slide 117 is connected at the outer end of a lever 121, the lower end of which is pivoted, at 122, to the standard or upright 114. At the upper end the lever 122 is provided with a pin or trundle 123 which enters a cam groove 124 in a cam 125. The cam 125 is adapted to be rotated by a pulley 126, the latter pulley being operated by a belt 127 which passes around a pulley 128 on the shaft 56 of the chocolate holding device 32 so that when the shaft 56 is rotated through the connection with the drive shaft 30, a reciprocatory movement is imparted to the slide 117. If desired an idle roll 128ª may be supported in advance of the device 112 in the path of movement of the molds to adapt the nuts or other material deposited in the molds by said device to be forced into the chocolate or other material.

The belt or endless carrier 23 does not extend throughout the entire length of the machine and the machine as constructed in its normal working condition requires that the molds be advanced along the tracks 16 and 17 and the members thereof by the engagement of one mold with another. That is in the normal working of the machine and so long as the magazine is filled with molds 19, only the lowermost mold or the last one is positively driven. In case all the molds in the magazine having been removed therefrom and the last one driven as far as it can be driven by the chain 23, it is necessary that some provision be made whereby the molds may be caused to pass along the tracks or else the chain 23 would have to be made long enough to move positively all the molds throughout the entire length of the machine. An auxiliary sprocket chain or endless carrier 129 extends lengthwise of the machine and this chain is provided with a single float or engaging element 130, Fig. 2, which is adapted at the proper time to engage the last mold being forced through the machine and to carry all the molds forward until they have been subjected to the vibratory action already explained. This chain 129 normally remains stationary and at one end is adapted to pass about a sprocket wheel 131 which is slidingly held on a normally stationary and tubular shaft 132, Fig. 9, said shaft having bearings in the frame sections or sides 13 and 14. A key 133 passes through a slot 134 in the tubular shaft 132 and is held to a manually movable rod 135, there being a spring 136 interposed between the sprocket wheels 131 and 24 tending normally to keep said wheels apart. The shaft 132 has a collar 137 adjacent to one of its bearings, and a second collar 138 is located adjacent to the sprocket wheel 24 to prevent the latter from moving along said shaft, said sprocket wheel 24 being adapted to rotate about said shaft 132. The hubs of the opposed sprockets are provided with clutch teeth and in the position shown only the sprocket wheel 24 will rotate. If the rod 135 by its handle 138ª is forced inwardly the key 133 will force the clutch teeth of the sprocket wheel 131 into engagement with the clutch teeth of the sprocket wheel 24 so that both wheels will rotate in unison and the chain 129 caused to move therewith. At the other end of the machine, the chain 129 passes about a sprocket wheel 139 and is adapted to be supported at intervals and for the greater part of its length by bars 140 and 140ª which may be held to cross braces and which prevent too much sag in the chain. It will thus be evident that when the chain 23 has exhausted the molds in the magazine, the chain 129 may, by the means shown, be made to force the molds through the machine.

The track rails 16, 17, 16ª and 17ª are adapted to be spread apart laterally of the machine to adapt the machine to accommodate molds of different widths. As shown, the tracks 16 and 17 are independently adjustable transversely of the machine from the track rails 16ª and 17ª, though it will be understood, of course, that the mechanism may be connected so that the adjustment may be simultaneous. The track rails 16 and 17 at one end are provided with pendent brackets 141 and at or near their other ends with pendent brackets 142. These brackets have threaded apertures and the brackets 141 are engaged by a threaded shaft 143 while the threaded openings of the brackets 142 are engaged by the threaded shaft 144. On the shaft 143 is a hand wheel 145 at one end and at the other end of the shaft is a miter gear 146. This gear 146 is in mesh with a similar gear 147 arranged on one end of a shaft 148. At the other end of the shaft 148 is a gear 149 which is in mesh with a similar gear 150 arranged on one end of the shaft 144. Each of the shafts 143 and 144 has its opposite ends oppositely threaded so that a rotation of the shaft will move the track rails toward or away from each other. As the two shafts 143 and 144 are connected together through the shaft 148, the shafts at both ends will be moved in unison, and as the side frames or plates 73 and 74 of the chocolate distributing means are mounted to move with the track rails 16 and 17, they will also be spread apart to accommodate the different widths of molds, the length of the blades 66 being sufficient as already explained, to permit this transverse adjustment. The adjustable members of the hood 62 are also secured to the frame plates 73 and 74, and consequently are adjusted when the track rails 16 and 17 are adjusted.

The track rails 16ª and 17ª are adjusted in the same manner as the track rails 16 and 17. In this case, the rails 16ª and 17ª at one end are provided with pendent brackets 151 and the rails at their other ends with pendent brackets 152. These brackets have threaded openings and the threaded brackets are provided with a threaded shaft 153 and the threaded openings of the brackets 152 by the threaded ends of a shaft 154. The shaft 153 is provided at one end with a hand wheel 155 for rotating the same and at the other end with a miter gear 156. The gear 156 is in mesh with the gear 157 on a shaft 158 and at the opposite end of the shaft 158 is a miter gear 159 which meshes with a similar gear 160 located on the end of the shaft 154. As the shafts 153 and 154 are oppositely threaded, the movement of the hand wheel will force the rails 16ª and 17ª away from or toward each other according to the direction of rotation of the hand wheel 155.

Figures 2, 13, 14:
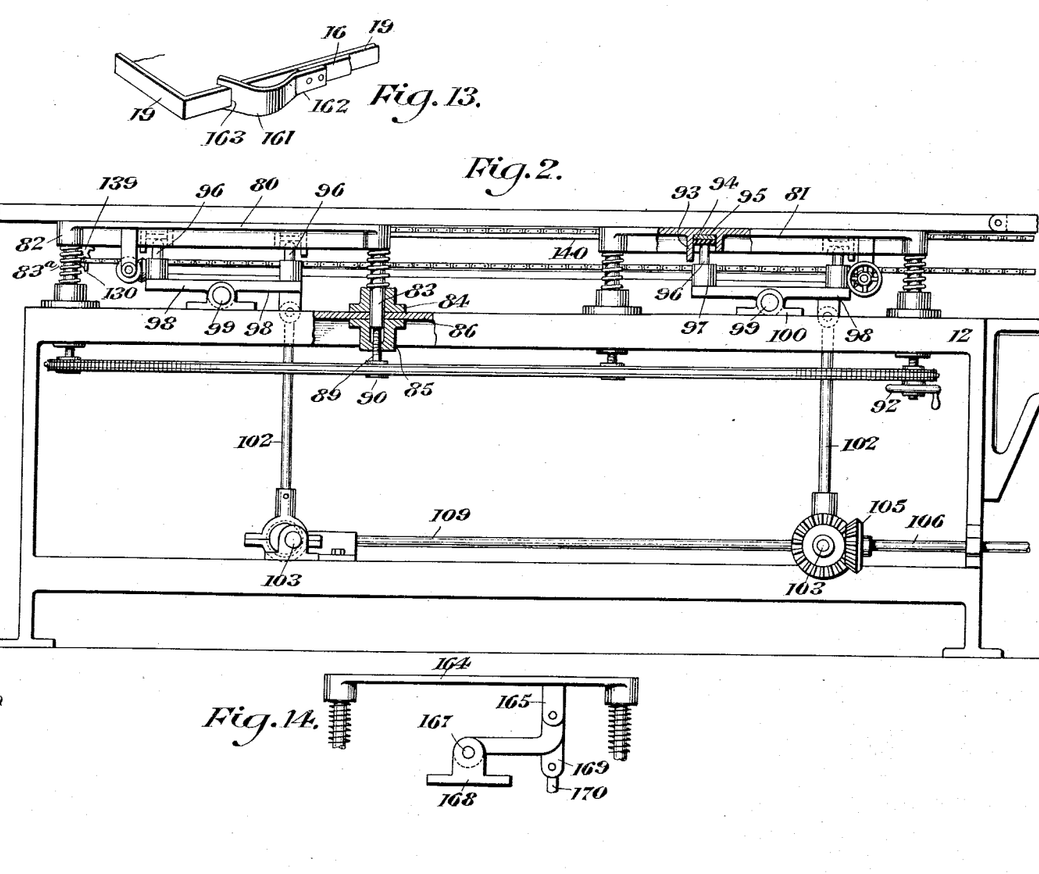
Fig. 2 is a side elevation, partly broken away, of the shaker table or other end of the machine and is a continuation of Fig. 1.
Fig. 13 is a fragmentary perspective view of a form of scraping means that may be employed for cleaning the sides of the molds.
Fig. 14 is a fragmentary elevation of a modified means for vibrating the molds.

In Fig. 13 and at a point between the device 112 and the vibratory means, there may be located on opposite sides of the machine yielding scraping devices 161. Each device 161 has one end, as 162, secured to one of the rail sections and its outer free end may be bent or curved and provided with a slotted portion, as 163, to span the sides of the molds as they are forced through the machine to scrape and clean the sides of the molds of any chocolate or material that may adhere thereto.

Fig. 14 shows a different arrangement whereby the track rails 16ª and 17ª may be given a vibratory movement. In this case, the platform or frame 164 to which the rail sections are held and which correspond to the platforms 80 and 81, has a projection 165 to which one end of an arm 166 is pivoted. The other end of the arm 166 is pivoted, at 167, to a bracket 168. A lug 169 extends downward from the arm 166 and connected to this lug is an eccentrically or otherwise operated rod 170. The platform 164 may be supported by posts and means similar to the platforms 80 and 81 and instead of being vibrated by impact of the pins 96, a positive connection is obtained by the means shown in this figure. As two platforms 164 are arranged at opposite ends of the machine, the rails will be given a positive and uniform up-and-down movement.

From the foregoing, it will be evident that simple and efficient means is provided whereby molds may be caused to pass through a machine in succession and during such movement be filled with chocolate or other material and the chocolate properly distributed over the molds; that simple means is provided whereby the molds may be subjected to a vibratory action to cause the chocolate or material to become compact and free from air holes; that simple means is provided whereby nuts or other articles or material may be deposited into the molds; that simple means is provided whereby various adjustments may be secured to adapt the machine for different sizes of molds; and that the machine or apparatus is simple in construction, may be readily made and assembled, and is accessible for repairs or other purposes.

What I claim is:

1. In a machine of the character described, the combination of a frame, a track having independent sections supported on said frame, a hopper adapted to support molds, an endless carrier adapted to move the molds out of the hopper in succession and to force those already moved along the track, an auxiliary endless chain adapted to be thrown into operation at will to move the molds, a device for filling the molds with material, a plurality of devices for distributing the material over the molds and to fill the same uniformly, a device for depositing articles into the filled molds, means for supporting a part of the track along which the molds move, means for rapidly vibrating said track supporting means to impart an up-and-down movement to the molds to cause the material to become compact and free of air holes, together with means for adjusting the track and parts supported thereby transversely of the machine to adapt the machine for different sizes of molds.

2. In a machine of the character described, the combination of a frame, a track having independent sections supported in said frame, means for holding a plurality of stacked molds, means adapted to move the molds out of said holding means in succession and to force the molds already moved along said track, auxiliary means adapted to be thrown into operation at will to move the molds along the track, means for filling the molds with material, means for independently supporting a part of the track, means for vibrating said track-supporting means to impart an up-and-down movement to the molds, means for adjusting the rails of the track laterally, and means supported by the track rails and adjustable therewith to adapt the machine for filling molds of different sizes.

3. In a machine of the character described, the combination of a frame, a track having sections supported on said frame, a hopper adapted to support molds, an endless carrier adapted to move the molds out of the hopper in succession and to force those already moved along the track, an auxiliary endless chain adapted to be thrown into operation at will to move the molds, a device for filling the molds with material, means for distributing the material over the molds and to fill the same uniformly, means for supporting a part of the track along which the molds move, and means for rapidly vibrating said track supporting means to impart an up-and-down movement to the molds to cause the material to become compact and free of air holes.

4. In a machine of the character described, the combination of a frame, a track having sections supported on said frame, means adapted to support molds, means adapted to move the molds out of the hopper in succession and to force those already moved along the track, auxiliary means adapted to be thrown into operation at will to move the molds, filling means for the molds, means for distributing the material over the molds and to fill the same uniformly, means for supporting a part of the track along which the molds move, and means for rapidly vibrating said track supporting means to impart an up-and-down movement to the molds to cause the material to become compact and free of air holes.

5. The combination of a frame, a track arranged on said frame, molds adapted to move along said track, an endless carrier for forcing the molds along the track, means for filling the molds with material, an auxiliary carrier normally inactive, and means whereby said auxiliary carrier may be made active to force the molds along the track.

6. The combination of a frame, a track arranged on said frame, molds adapted to move along said track, an endless carrier for forcing the molds along the track, means for filling the molds with material, an auxiliary endless carrier normally inactive, and means whereby said auxiliary carrier may be made active to force the molds along the track.

7. In a machine of the character described the combination of a frame, a track having independent sections supported in said frame, means adapted to hold a plurality of stacked molds, means adapted to move the molds out of said holding means in succession and to force those already moved along the track, auxiliary means adapted to be thrown into operation at will to move the molds along the track, means for depositing material in the molds, and means for vibrating a part of the track to shake the filled molds.

8. In a machine of the class described, the combination of mold-supporting rails, means for moving molds along said rails, side plates held to and projecting above the rails and provided with registering apertures, a distributing device extending transversely of the rails, means for supporting said distributing device above the rails with its ends projecting through the openings in the side plates, and means for adjusting the rails with the side plates thereon toward and from each other.

9. In a machine of the class described, the combination of mold-supporting rails, means for moving molds along the rails, parallel guard plates held to the rails having registering openings therein, a pivotally supported distributing blade extending transversely of the rails and projecting loosely through the openings in said guard plates, yieldable means for forcing the lower edge of the blade into engagement with the molds, means for preventing material passing through the openings in the guard plates, and means for adjusting the rails with the guard plates thereon bodily toward and from each other.

In testimony whereof I hereunto affix my signature.

WILLIAM JAMES WELSH.